March 14, 1939.  H. UNCKEL  2,150,734
DRAWING DISK
Filed Oct. 15, 1937
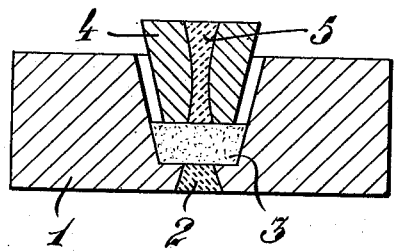
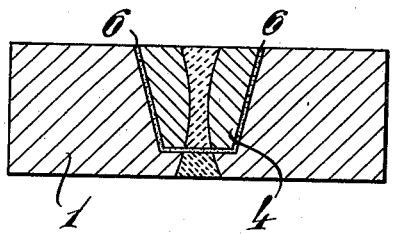
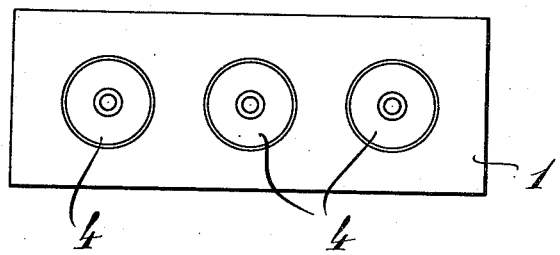
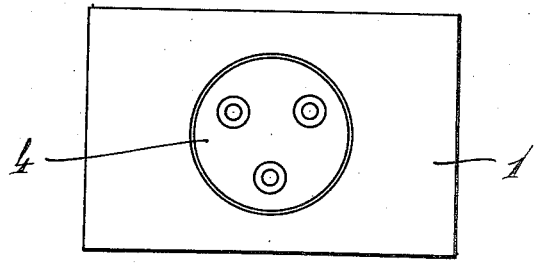
Inventor
Herman Unckel
by Sommers + Young
attys.

Patented Mar. 14, 1939

2,150,734

UNITED STATES PATENT OFFICE 2,150,734

DRAWING DISK

Herman Unckel, Finspong, Sweden

Application October 15, 1937, Serial No. 169,336
In Sweden September 8, 1937

7 Claims. (Cl. 205—29)

This invention refers to wire drawing appliances having a die consisting of a non-metallic material.

It has already been proposed to form dies for wire drawing purposes from a pulverulent mass of carbides of tungsten, titanium, chromium, or the like, an auxiliary metal, such as iron, being used to bind the carbide grains together. Such auxiliary metals do not combine with the non-metallic grains but keep them together only mechanically. For this reason the hard grains are easily torn off.

It has also been proposed to manufacture such dies from other hard non-metallic materials, such as china, hard glass masses, silicon carbide, alundum, and quartz to which diamond dust or one or more hard carbides is added, the components being sintered together by means of an added ceramic binder or bound by other metallic or non-metallic binders without sintering.

The object of the invention is to provide a wire drawing die which is easy to manufacture and possess a high hardness and resistance against wearing.

According to the invention the die consists of a ceramic mass the chief constituent of which is aluminum oxide amounting to from 60 to 98%, the remainder being china-forming substances capable of reacting with the alumina in burning the die.

I have found that ceramic materials containing a high percentage of mullite, $3Al_2O_3.2SiO_2$, or sillimanite, $Al_2O_3.SiO_2$, or similar compounds of aluminum oxide and silica are very suitable for drawing dies on account of their great hardness and resistance against wearing. Ordinary china which is burnt at a temperature between 1400 and 1600° C. contains as chief constituents kaolin, silica and felspar in varying proportions, the content of alumina amounting to 20 to 30% and the content of silica to 30 to 70% while the remainder consists of oxides of potassium, sodium, calcium and manganese. In the burning process certain reactions take place whereby the original constituents are changed and combined with each other. By said reactions new compounds, for instance mullite, are formed. The ordinary china contains, however, a comparatively small percentage of said compound. Hard china having a higher content of alumina than the ordinary china contains somewhat more mullite. By increasing the percentage of alumina over the amount generally present in hard china while reducing the content of alkali below 10% a product may be obtained which after the burning consists substantially of mullite or sillimanite. It is not known which compounds or solid solutions are formed when a higher percentage of alumina than that corresponding to the composition of the mullite or the sillimanite respectively is used, but also such compounds or solid solutions have a very high hardness and resistance against wearing.

On account of the very great brittleness of dies manufactured from hard non-metallic materials it is of an essential importance for the strength of the die that it be mounted in its holder in such manner that not too great tensile stresses arise in the material during the drawing operation. It is known for such purpose to shrink the holder onto the non-metallic die, preferably with an intermediate layer of a soldering metal. When shrinking the holder on the die without an intermediate layer it is necessary to have the die carefully ground on the outer surface so that the inner surface of the metallic holder will fit closely to the surface of the die, in as much as the die otherwise easily cracks at the shrinking or in the subsequent use of the drawing disk. An intermediate layer, for instance of soldering metal, helps to smooth out any unevenness on the outer surface of the die so that the expensive grinding of the latter may be dispensed with. It is also known to carry out the fitting surfaces with a conical shape and apply an intermediate layer of metal foils or of a powder in order to fill out any unevenness between the die and the holder and thus secure a uniform fit between the die and the holder. It is, however, in such case not possible to attain a simultaneous support of the bottom surface of the die, such support being of great importance as the die is easily cracked when subjected to great stresses without being supported at its end.

I prefer, therefore, to mount the non-metallic die in the holder in such manner, that as an intermediate layer and binding agent between the die and the holder a non-metallic material is used which in molten state wets and adheres to the metal of the holder as well as to the non-metallic material of the die. Such materials are for instance borax, glass, enamel, and artificial and natural resins.

Before mounting the die in the holder the drawing channel of the die as well as the exit opening of the holder are preferably filled with some refractory material, as for instance asbestos. In the recess of the holder is then placed a suitable quantity of the binding agent, preferably in a powdered state. The die is then placed on the binding agent and the whole is heated in a suitable furnace until the binding agent melts and the die sinks down into the recess of the holder. By exerting a light pressure on the die while the binding agent is in a molten state, the excess of the latter may be removed so that only a thin layer of binding agent will remain between the bottom and the side walls of the recess in the holder on one hand and the corresponding end surface and the outer surface of the die on the other hand. The die and the holder are then cooled whereby the holder shrinks until it closely surrounds the die. Finally the refractory material is removed from the drawing channel of the die and the exit opening of the holder and, if required, the drawing channel is ground, whereupon the drawing appliance is ready for use. By the great mass of the holder in comparison with the die the heating of the latter takes place rather slowly whereby heating cracks in the die are avoided.

In the accompanying drawing I have illustrated some embodiments of my invention. Fig. 1 is a vertical section of a die and its holder before the die has been definitely mounted in the holder. Fig. 2 is a similar view after the mounting of the die in the holder before removal of the refractory material from the drawing channel. Fig. 3 shows a die holder having three dies. Fig. 4 shows a holder with a die having three drawing channels.

Referring now to Fig. 1 of the drawing, 1 is the metallic holder having a conical recess for the die. Numeral 2 designates the exit opening of the holder which is filled with asbestos or other refractory material. Numeral 3 indicates a pulverulent binding agent placed in the recess of the holder. Numeral 4 indicates the die placed upon the binding agent and the drawing channel of the die which is likewise filled with asbestos or other refractory material is designated by numeral 5. In Fig. 2 which illustrates the step of the manufacture, when the binding agent has melted, the die has sunk down into the recess of the holder while displacing the excess of binding agent so that the remaining portion thereof forms a thin layer 6 below the bottom of the die and around its outer surface.

The drawing appliance according to the invention can be produced with two or more dies mounted in a common metallic holder, as for instance is illustrated in Fig. 3 which shows an elevation of a metallic holder 1 with three non-metallic drawing dies 4. According to the invention drawing appliances having a die provided with two or more drawing channels may be produced, as for instance is illustrated in Fig. 4, which shows an elevation of a metallic holder 1 with a non-metallic die 4 provided with three drawing channels.

What I claim is:

1. A die for wire drawing, consisting of a burned ceramic material containing from 60 to 98% of aluminum oxide, the remainder being substances capable of reacting with alumina to form china in the burning of the die.

2. A die for wire drawing, consisting of a burned ceramic material containing from 60 to 98% of aluminum oxide, the remainder consisting essentially of alkali oxides, silica and lime.

3. A die for wire drawing, consisting of a burned ceramic material containing from 60 to 98% of aluminum oxide and less than 10% of alkali oxides.

4. A die for wire drawing, consisting of a burned ceramic material composed of at least 60% of aluminum oxide and substantially all the rest being silica.

5. A die for wire drawing, consisting substantially of mullite ($3Al_2O_3.2SiO_2$).

6. A die for wire drawing, consisting substantially of sillimanite ($Al_2O_3.SiO_2$).

7. A drawing appliance for wire drawing, comprising a die of a burned ceramic material containing from 60 to 98% of aluminum oxide and the rest being substances capable of reacting with the alumina to form china in the burning of the die, a metallic holder having a recess for said die, and a solidified non-metallic binding agent capable of wetting the metal of the holder as well as the material of the die when in a molten state and forming a thin layer between the bottom and the side walls of the recess of the holder on the one hand and the corresponding surfaces of the die on the other hand.

HERMAN UNCKEL.